United States Patent [19]

Kordulla et al.

[11] Patent Number: 4,700,065
[45] Date of Patent: Oct. 13, 1987

[54] PICK-UP HEAD FOR INCREMENTAL TRANSMITTER, PARTICULARLY ANGULAR INCREMENTAL TRANSMITTER

[75] Inventors: Hans Kordulla; Dirk Jansen; Günter Schmid, all of Überlingen, Fed. Rep. of Germany

[73] Assignee: Bodenseewerk Geratetechnik GmbH, Bodensee, Fed. Rep. of Germany

[21] Appl. No.: 801,199

[22] Filed: Nov. 25, 1985

[30] Foreign Application Priority Data

Dec. 8, 1984 [DE] Fed. Rep. of Germany ....... 3444878

[51] Int. Cl.⁴ ................................................ G01D 5/34
[52] U.S. Cl. ........................... 250/231 SE; 250/237 G
[58] Field of Search ............. 250/231 SE, 237 G, 239; 324/175; 340/347 P; 356/395

[56] References Cited

U.S. PATENT DOCUMENTS 4,338,517 7/1982 Perrine ........................... 250/231 SE
4,508,965 4/1985 Casciani ..................... 250/237 G X

FOREIGN PATENT DOCUMENTS 3145833 6/1982 Fed. Rep. of Germany .
3331118 10/1984 Fed. Rep. of Germany .
3327849 2/1985 Fed. Rep. of Germany .

Primary Examiner—Eugene R. LaRoche
Assistant Examiner—Steven J. Mottola
Attorney, Agent, or Firm—Lee, Smith & Zickert

[57] ABSTRACT

A pick-up head for angular incremental transmitter comprises a transmitter portion (14) with luminescence diodes connected to a hybrid circuit. The hybrid circuit is placed in a hybrid housing (24) sealed by a lid with collimator lenses. A detector portion (16) comprises photodiodes on a hybrid circuit, which includes amplifiers for the photodiodes. The hybrid circuit is placed in a hybrid housing (46) the lid forming a stationary grating (64). The hybrid housings are hermetically sealed and supported at a distance from each other. A rotatable disc (10) with a movable grating (18) extends between the hybrid housings.

3 Claims, 8 Drawing Figures

PICK-UP HEAD FOR INCREMENTAL TRANSMITTER, PARTICULARLY ANGULAR INCREMENTAL TRANSMITTER The invention relates to a pick-up head for incremental transmitters particularly angular incremental transmitters, comprising (a) light source means and a collimator optical system for generating a parallel light beam originating from the light source means, (b) a stationary grating in the path of rays of the parallel light beam, (c) a movable disc extending into the path of rays of the light beam and forming a movable grating extending in the area of the light beam essentially parallel to the stationary grating, the division of the movable grating being essentially equal to that of the stationary grating, and (d) detector means arranged on the side of the disc remote from the light source means and exposed to the light beam.

Such a pick-up head is known from DE-B-1 153 909. Depending on whether the movable grating is in alignment with the stationary grating or whether always the land of one grating is located in front of a gap of the other grating a substantial part of the parallel light beam is transmitted or the light beam is covered. Sequences of light pulses are generated by a Moirémodulation when the gratings are moved relative to each other. These light pulses are detected by the detector means and can be counted by a counter to which the output signal of the detector means is applied. Thereby it is possible to provide a very fine division, without the intensity of the light pulses becoming too low, as this would be the case if one single gap of the grating were scanned.

DE-B-1 084 928 shows similar arrangements.

By diffraction and interferences images of the grating (Talbot stripes) appear at the first grating hit by the parallel light beam in levels parallel to the grating and located at discrete distances from the grating.

The distances of the Talbot stripes are equal to the grating constant w of the grating. The distances of the levels of the grating are integral multiples of $w/\lambda$, if $\lambda$ is the wavelength of the used light. From DE-C-22 38 413 it is known, in order to improve the degree of modulation, to provide two pairs of gratings becoming effective in the path of rays one after the other and arranged at this distance $w/\lambda$ from each other. A similar arrangement is described in the thesis "Dreigitterschrittgeber" by Jörg Wilhelm, TU Hannover, 1978, pages 33 to 41.

It is further known to provide four grating fields with 90° relative phase displacement on the movable disc, the detector arrangements of which each is associated with one of these grating fields being connected in opposition, in order eliminate the direct current components. Two alternating signals are obtained having a phase shift of 90° relative to each other which allows detection of the direction of rotation and a quadruplication of the angular resolution (DE-C-22 38 413, DE-PS 2002583, DE-C-25 10 113, DE-A-27 21 135 and DE-B-25 54 771).

The known pick-up heads for high resolution angular incremental transmitters are too large for some applications. They are unsuitable for applications under extreme environmental conditions as, for example, greatly varying temperatures, exposure to temperature shock, vibrations and high accelerations. The known pick-up heads are difficult to assemble and to adjust with the required precision.

The upper limiting frequency for transmitting the output signals of the detector means has to be very high, if a pick-up head is to detect quick movements with high accuracy. The maximum permissible angular rate of an angular incremental transmitter results from the number of the grating lands or angular increments per rotation. In known pick-up heads the amplifiers are arranged at a distance in space from the detector means. The capacities and inductances of the relatively long conductors lower the upper limiting frequency. There is a risk of strewing-in of electromagnetical fields upon this conductor.

It is the object of the invention to make an incremental transmitter of the above defined type small and compact, to make it insensitive to extreme environmental conditions, to assemble and adjust it with low costs and to enable the transmitter to operate at high speeds with high angular resolution by obtaining a high limiting frequency.

According to the invention this object is achieved in that (e) the light source means are formed by at least one integrated light source attached and connected to a hybrid circuit, (f) the light source with the hybrid circuit is arranged in a hermetically sealed, flat hybrid housing, (g) the hybrid housing is sealed by a lid comprising at least one short-focus lens formed as collimator lens, (h) the detector means comprise at least one detector attached and connected to a hybrid circuit with at least one amplifier, (i) the detector with the hybrid circuit is arranged in a hermetically sealed hybrid housing and (j) the hybrid housing is sealed by a lid formed by the stationary grating.

A hybrid circuit is, as is well-known, a micro circuit in which discrete components and semiconductor components are attached to a network of passive components and conductors metallized upon ceramics or glass (Graf "Modern Dictionary of Electronics" Howard W Sams u. Co. Inc., The Bobbs-Merrill Co. Inc., 4 ed. page 272). Such hybrid circuits are sealed in "hybrid housings". According to the invention the light source and the detector are attached and connected to such hybrid circuits and hermetically sealed in hybrid housings. Hereby the pick-up head becomes as far as possible insensitive against environmental conditions. A luminescence diode serves as light source. Such a luminescence diode is small and insensitive to vibrations and accelerations. However its light yield is smaller than that obtained with a conventional incandescent bulb. Therefore a very short-focus collimator lens has to be used covering a portion as large as possible of the light emitted by the luminescence diode. This is permitted by a lens in the lid of the flat hybrid housing serving as collimator optical system. The detector is arranged on a hybrid circuit, which forms also the amplifier for the detector signal. Thereby long conductors with the disadvantages described are avoided, and a high limiting frequence can be obtained. The whole arrangement will become very small and compact and is easily assembled and adjusted.

Modifications of the invention are subject matter of the sub-claims.

An embodiment of the invention will now be described in greater detail with reference to the accompanying drawings.

Figure 1:
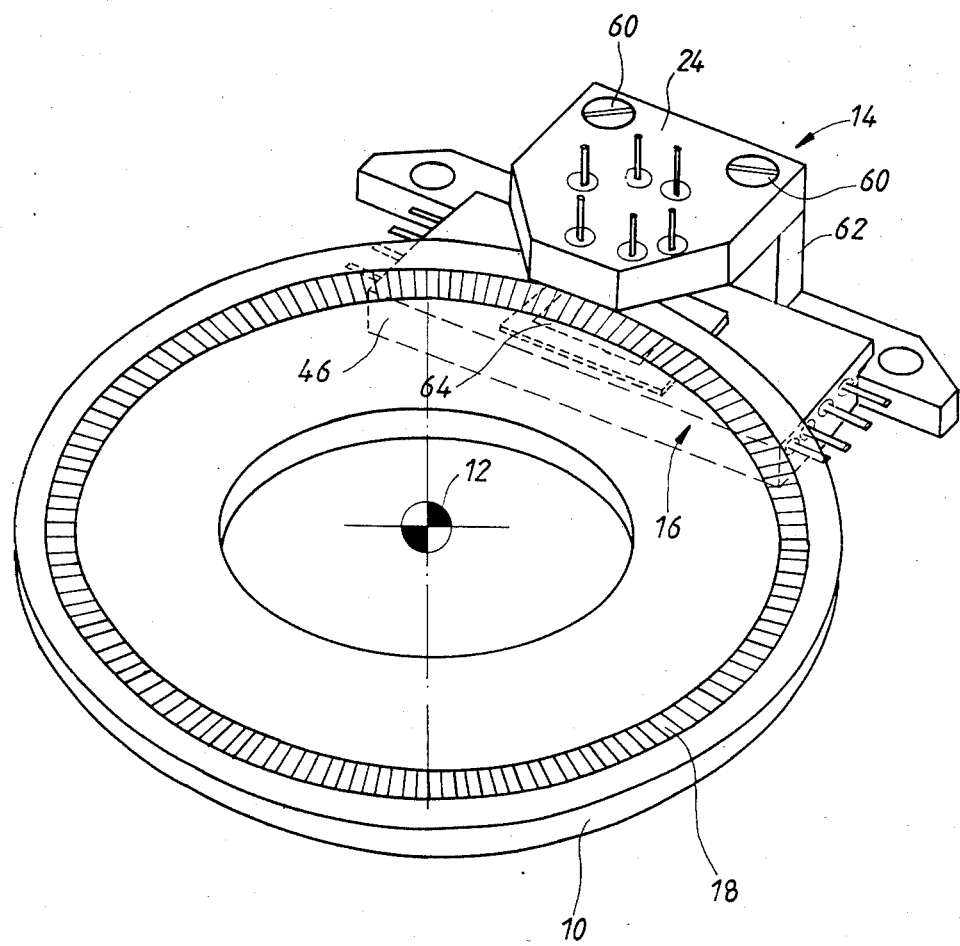
FIG. 1 is a perspective illustration of an angular incremental transmitter with a pick-up head.
Figure 2:
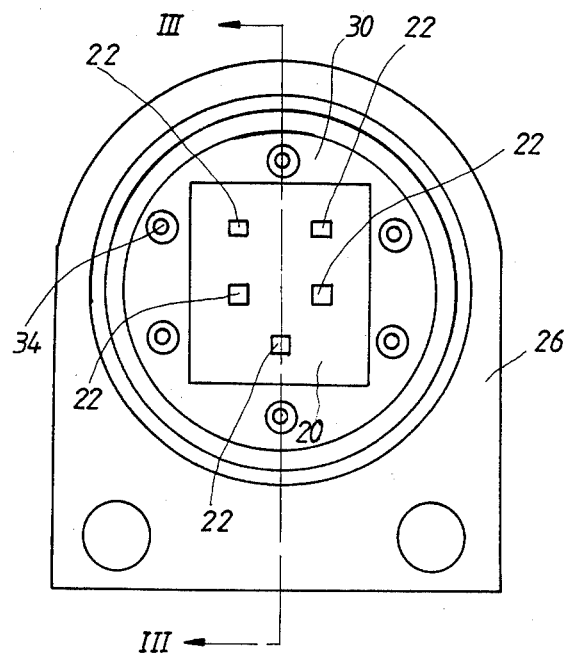
FIG. 2 shows the transmitter portion of the pick-up head with the lid detached.
Figure 3:
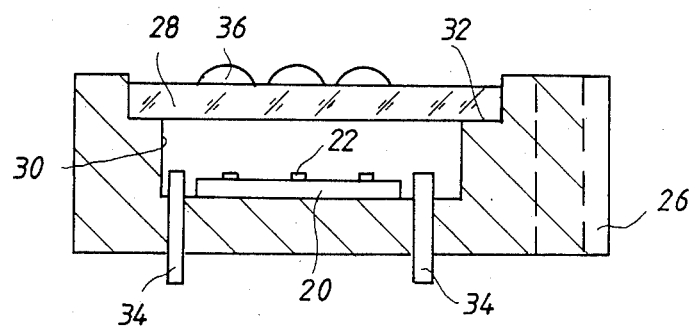
FIG. 3 shows a section through the transmitter portion with the lid essentially taken along line III—III of FIG. 2.
Figure 4:
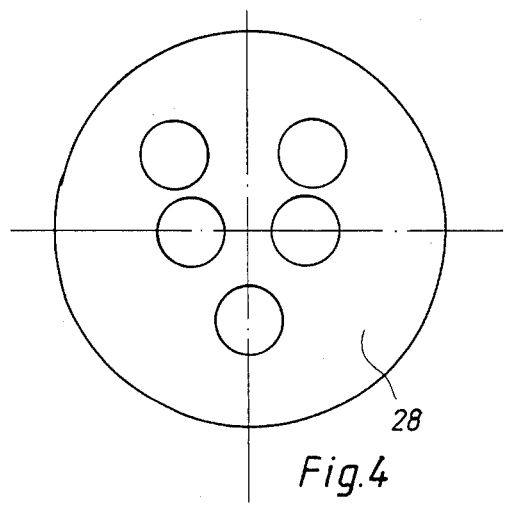
FIG. 4 is a front view of the lid.

An angular incremental transmitter comprises a disc 10, which is rotatably on an axle 12, a transmitter portion 14 and a detector portion 16. The disc 10 has an annular, finely divided grating 18 with radial grating lands. The grating 18 for example has 8000 grating lands or increments per rotation. The transmitter portion 14 comprises a hybrid circuit 20 provided with five luminescence diodes 22. The luminescence diodes 22 with the hybrid circuit 20 are contained in a flat hermetically sealed hybrid housing 24. The hybrid housing 24 has a lower housing portion 26 and a lid 28. The lower housing portion 26 forms a recess 30 which communicates with an annular shoulder or contact surface 32. The lid 28 is placed sealingly on the shoulder 32. The hybrid circuit 20 is placed on the bottom of the recess 30. Numeral 34 designates insulated connection pins.

The lid 28 comprises in alignment with the luminescence diodes 22 five short-focus lenses 36 serving as collimator optical systems. The luminescence diodes 22 are placed in the focal points of the lenses such that each luminescence diode 22 and lens 36 generates a collimated light beam.

Figure 5:
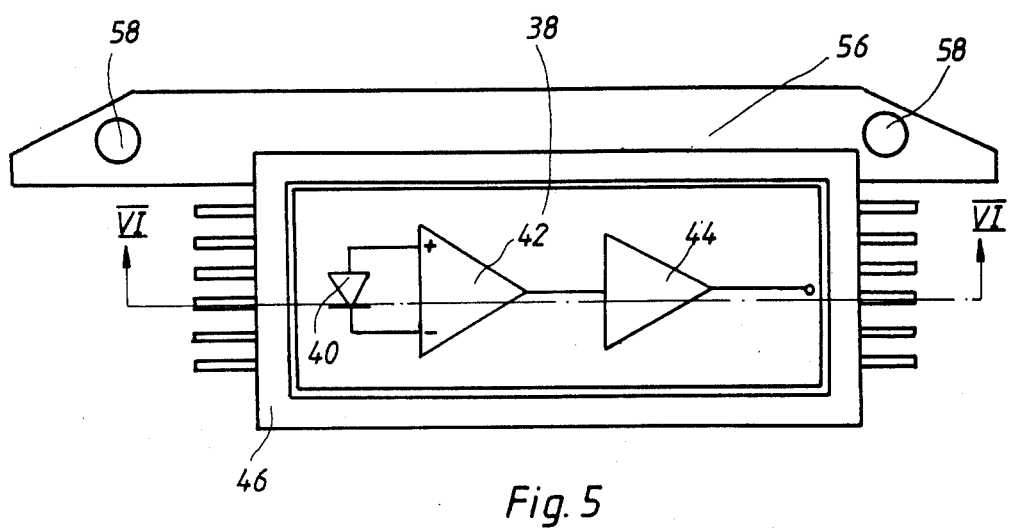
FIG. 5 shows schematically a plan view upon the detector portion wherein the detector means and the amplifier are indicated in the form of a wiring diagram.
Figure 6:
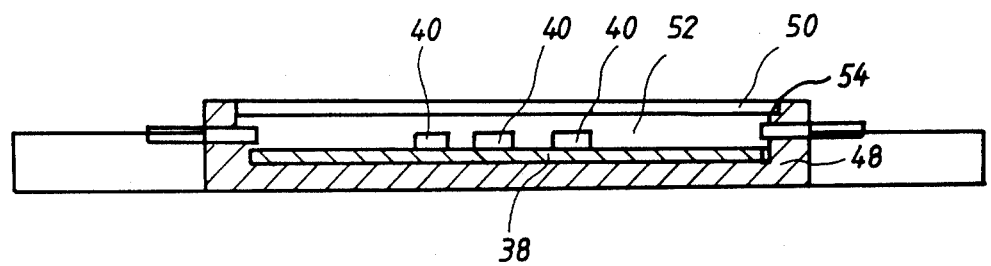
FIG. 6 shows a section through the detector portion essentially taken along the line VI—VI of FIG. 5.

The collimated light beams impinge upon the detector portion 16 through the annular, divided grating 18 of the disc 10. The detector portion 16 comprises a hybrid circuit 38. The hybrid circuit 38 carries detectors 40 in the form of photodiodes, as indicated in Fig. 5. The hybrid circuit 38 comprises also an amplifier 42 and a switching stage 44 as also indicated in Fig. 5. The hybrid circuit 38 with the detectors 40 is contained in a flat-rectangular hybrid housing 46. The hybrid housing 46 has a lower housing portion 48 and a lid 50. The lower housing portion 48 forms a recess 52 which communicates with a shoulder or contact surface 54. The lid 50 is placed sealingly on the contact surface 54. A ledge 56 with fastening holes 58 is provided on the hybrid housing.

The hybrid housing 24 of the transmitter portion 14 is connected with the ledge 56 by screws 60 with a spacer 62 interposed. The two hybrid housings 24 and 46 are thus held at a fixed distance from each other. The disc 10 extends between these two hybrid housings 24 and 46.

The lid 50 of the hybrid housing 46 is formed as a stationary grating 64 with radial grating lands. The parallel light beams thus impinge upon the detectors 40 through the movable grating 18 of the disc 10 and the stationary grating 64 formed by the lid 50. Each detector 40 is in alignment with an associated luminescence diode 22.

A monolithic luminescence diode chip array can also be provided instead of a luminescence diode connected to a hybrid circuit. The detectors also can be formed by other types of photodetectors such as photoelements or photoresistors instead of photodiodes. The lenses can be Fresnel lenses.

Figure 7:
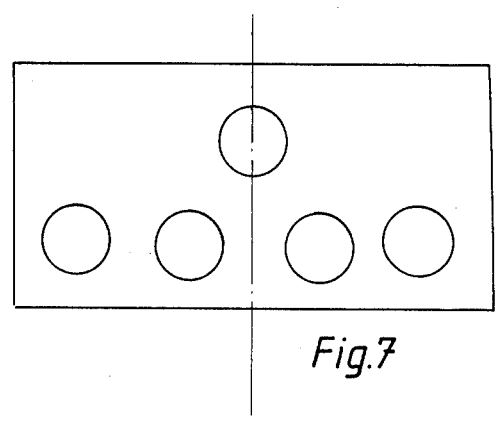
FIG. 7 shows a modified form of the lid for a transmitter portion having another arrangement of the luminescence diodes.
Figure 8:
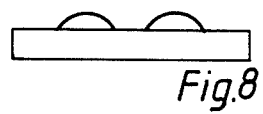
FIG. 8 is an associated end view.

FIGS. 7 and 8 show another embodiment of the transmitter portion characterized by another arrangement of the luminescence diodes and lenses.

We claim:

1. A pick-up assembly for an incremental motion transmitter comprising: light souce means and collimator optical means for generating a collimated light beam emanating from said light source means, detector means exposed to said collimated light beam and spaced from said light source means and collimator optical means to define a gap between said detector and said light source and collimator optical means, stationary grating means arranged in the path of said collimated light beam and having a pattern of alternating lands and interstices, whereby a movable disc having a movable grating with a pattern of alternating opaque lands and transparent interstices may extend into said gap and into the path of said collimated light beam to vary the light flux falling on said detector means as a function of the relative positions of said disc and said stationary grating and in which said light source means comprise at least one integrated light source, a hermetically sealed, flat first hybrid housing is arranged on a light source side of said gap, and said light source means being arranged in said first housing, said first hybrid housing comprises a light source main housing portion and a light source lid adjacent to said gap and sealingly closing said main housing portion, said collimator optical means includes at least one short-focus lens arranged in said light source lid, said detector means comprise at least one detector and hybrid circuit means, said one detector being affixed and electrically connected to said hybrid circuit means and said hybrid circuit means comprising at least one amplifier electrically connected to said detector for amplifying the detector signals thereof, a hermetically sealed, second hybrid housing is arranged on a detector side of said gap remote from said light source side, said detector means with said hybrid circuit means is arranged in said second hybrid housing, and said second hybrid housing comprises a detector main housing portion and a detector lid adjacent to said gap and sealingly closing said detector main housing portion, said stationary grating means comprises a pattern on said detector lid.

2. Pick-up head as set forth in claim 1 in which the integrated light source is formed by a luminescence diode connected to a hybrid circuit.

3. Pick-up head as set forth in claim 1 in which the integrated light souce is a luminescence diode chip array.

* * * * *